(12) United States Patent
Mitsui et al.

(10) Patent No.: US 10,780,409 B2
(45) Date of Patent: Sep. 22, 2020

(54) SOLID-GAS REACTION SUBSTANCE-FILLED REACTOR AND METHOD FOR MANUFACTURING THE SAME

(71) Applicant: KABUSHIKI KAISHA TOYOTA CHUO KENKYUSHO, Nagakute-shi, Aichi-ken (JP)

(72) Inventors: Hiroyuki Mitsui, Nagakute (JP); Masakazu Aoki, Nagakute (JP); Takafumi Yamauchi, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 191 days.

(21) Appl. No.: 16/189,335

(22) Filed: Nov. 13, 2018

(65) Prior Publication Data

US 2019/0168181 A1 Jun. 6, 2019

(30) Foreign Application Priority Data

Dec. 4, 2017 (JP) ................................. 2017-232359

(51) Int. Cl.
*F17C 11/00* (2006.01)
*B01J 7/00* (2006.01)
(Continued)

(52) U.S. Cl.
CPC ................ *B01J 7/00* (2013.01); *B01D 53/58* (2013.01); *B01D 53/62* (2013.01); *B01D 53/82* (2013.01);
(Continued)

(58) Field of Classification Search
CPC ............ B01D 53/0407; B01D 53/0446; B01D 53/343; B01D 53/58; B01D 53/62;
(Continued)

(56) References Cited

U.S. PATENT DOCUMENTS

| 4,609,038 A * | 9/1986 | Ishikawa | C01B 3/0005 165/104.12 |
| 2010/0236767 A1* | 9/2010 | Toh | C01B 3/0026 165/182 |

FOREIGN PATENT DOCUMENTS

| JP | S62-124399 A | 6/1987 |
| JP | 2000-111193 A | 4/2000 |

(Continued)

OTHER PUBLICATIONS

Feb. 4, 2020 Office Action issued in Japanese Patent Application No. 2017-232359.

*Primary Examiner* — Frank M Lawrence, Jr.
(74) *Attorney, Agent, or Firm* — Oliff PLC

(57) ABSTRACT

A solid-gas reaction substance-filled reactor includes a core part in which heat medium heat-transfer tubes and spacers are alternately stacked, a gas introduction/discharge part that communicates with opening ends of the spacers, and a heat medium introduction/discharge part that communicates with heat medium flow paths. Filled bodies including metallic foil bags and a solid-gas reaction substance filled in the bags are inserted into the spacers. At least the filled bodies and the heat medium heat-transfer tubes are brazed to each other. The solid-gas reaction substance-filled reactor is obtained by stacking the filled bodies with the solid-gas reaction substance filled into the metallic bags, the heat medium heat-transfer tubes, and the spacers in a predetermined order and then brazing them.

12 Claims, 12 Drawing Sheets

(51) Int. Cl.
  *B01D 53/62* (2006.01)
  *B01D 53/58* (2006.01)
  *B01D 53/82* (2006.01)
  *B01J 19/00* (2006.01)
  *C01B 3/00* (2006.01)
  *B01J 15/00* (2006.01)
  *F25B 35/04* (2006.01)
  *F25B 17/08* (2006.01)
  *F25B 17/12* (2006.01)

(52) U.S. Cl.
  CPC ........... *B01J 15/00* (2013.01); *B01J 19/0013* (2013.01); *C01B 3/0021* (2013.01); *C01B 3/0026* (2013.01); *F17C 11/00* (2013.01); *F17C 11/005* (2013.01); *F25B 35/04* (2013.01); *B01D 2257/108* (2013.01); *B01D 2257/406* (2013.01); *B01D 2257/504* (2013.01); *B01D 2257/80* (2013.01); *B01J 2219/00081* (2013.01); *F25B 17/08* (2013.01); *F25B 17/12* (2013.01)

(58) Field of Classification Search
  CPC .............. B01D 53/82; B01D 2253/102; B01D 2253/108; B01D 2253/1126; B01D 2259/65; B01D 2257/108; B01D 2257/406; B01D 2257/504; B01D 2257/80; B01J 15/00; B01J 19/0013; B01J 2219/00081; B01J 7/00; C01B 3/001; C01B 3/0021; C01B 3/0026; F25B 17/08; F25B 17/12; F25B 35/04; F17C 11/00; F17C 11/002; F17C 11/005; F17C 11/007
  USPC .................. 206/0.7; 96/108, 146; 423/658.2; 429/515
  See application file for complete search history.

(56) References Cited

FOREIGN PATENT DOCUMENTS

| | | | |
|---|---|---|---|
| JP | 2002-250593 A | | 9/2002 |
| JP | 2006-266350 A | * | 10/2006 |
| JP | 4516462 B2 | | 8/2010 |
| JP | 2015-111033 A | | 6/2015 |
| WO | 2008/023732 A1 | | 2/2008 |

* cited by examiner

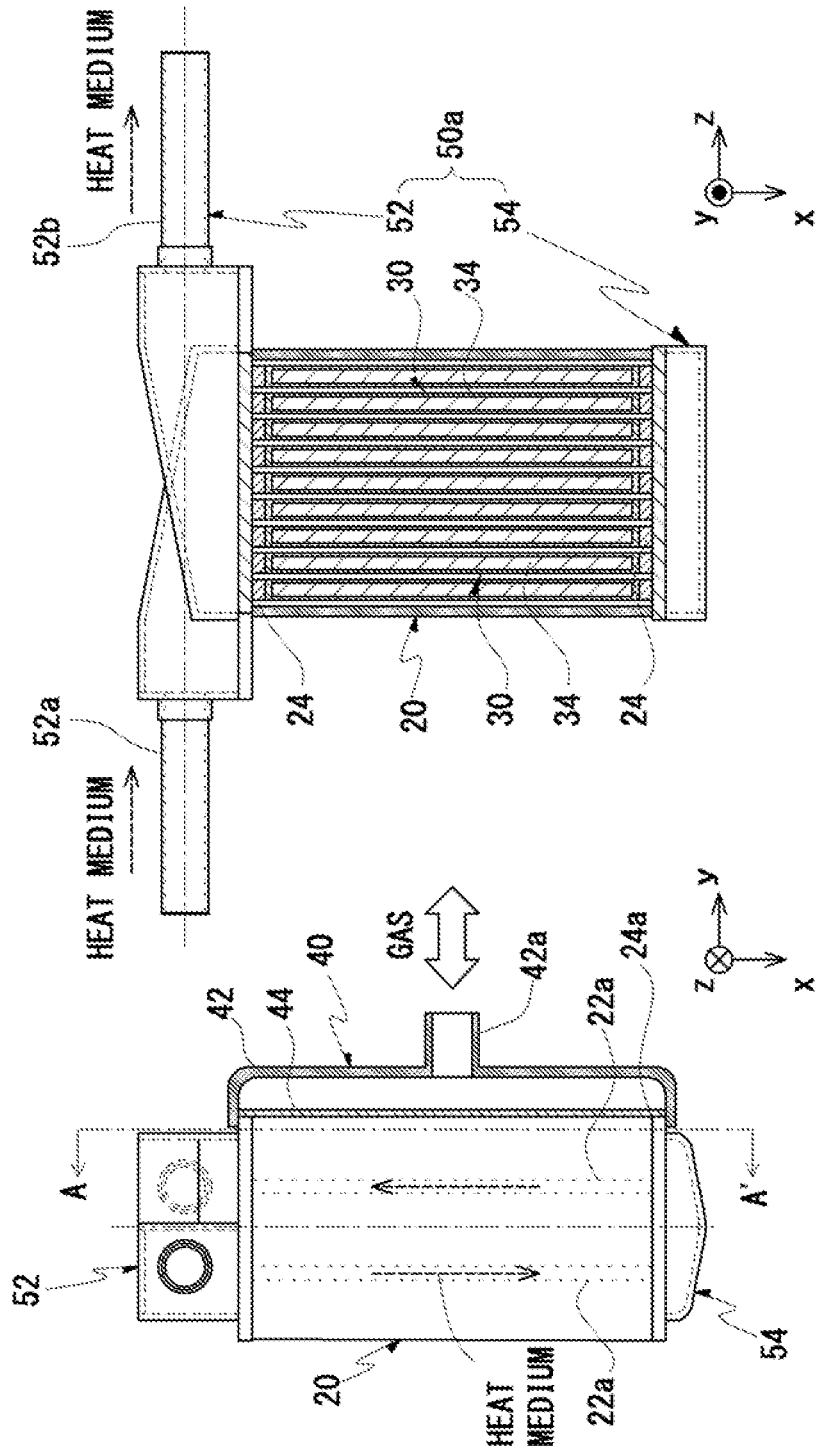

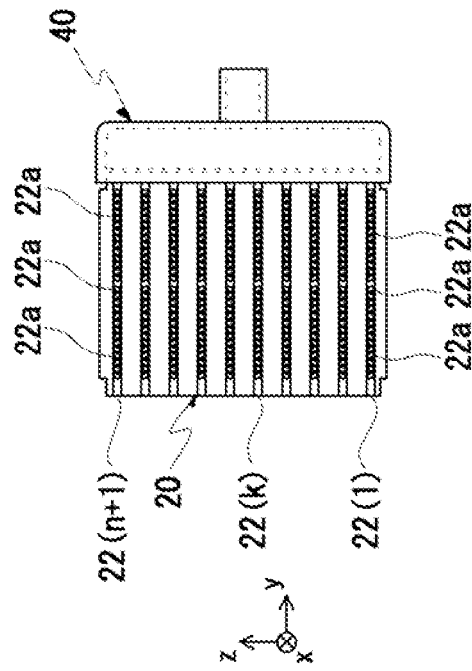
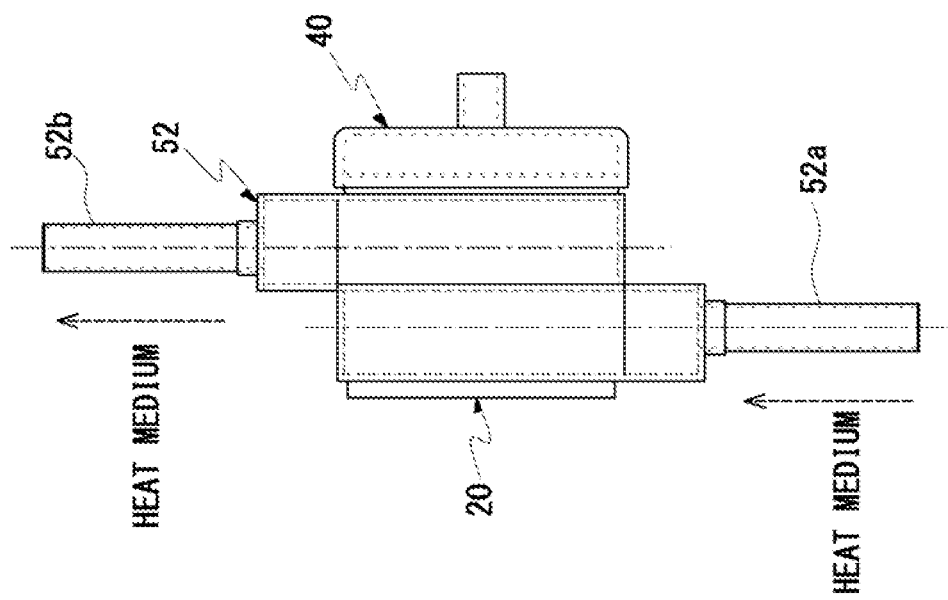

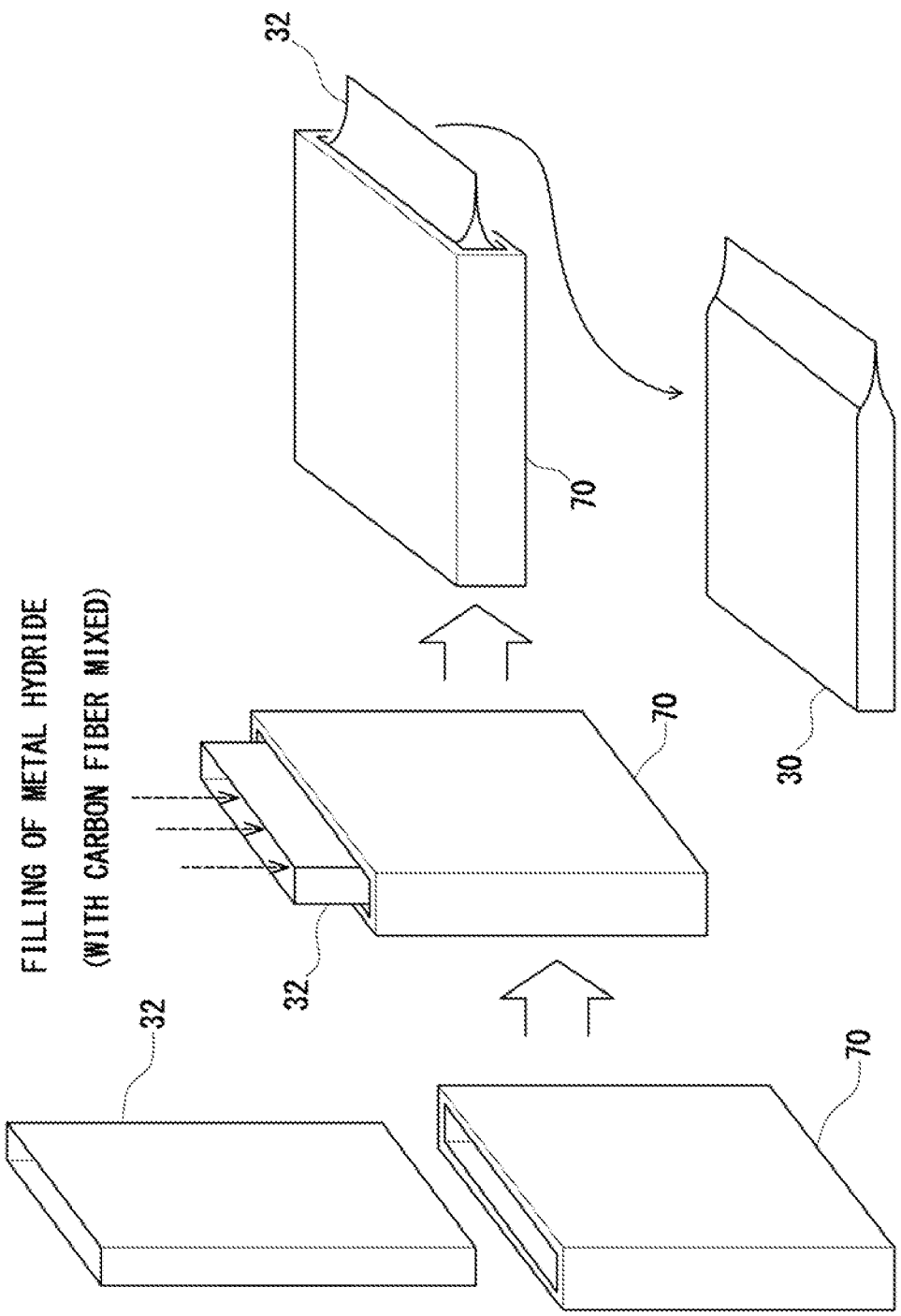

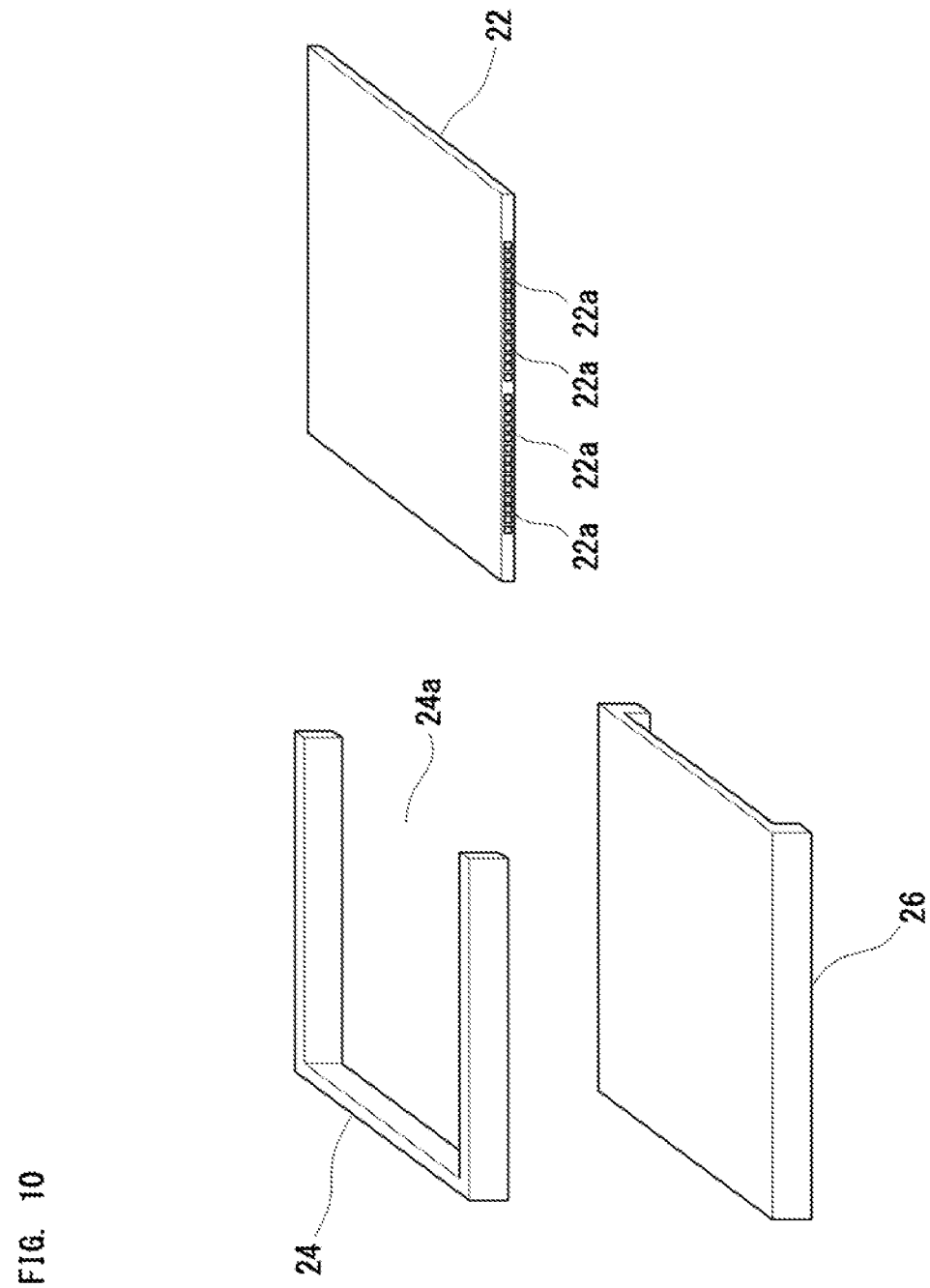

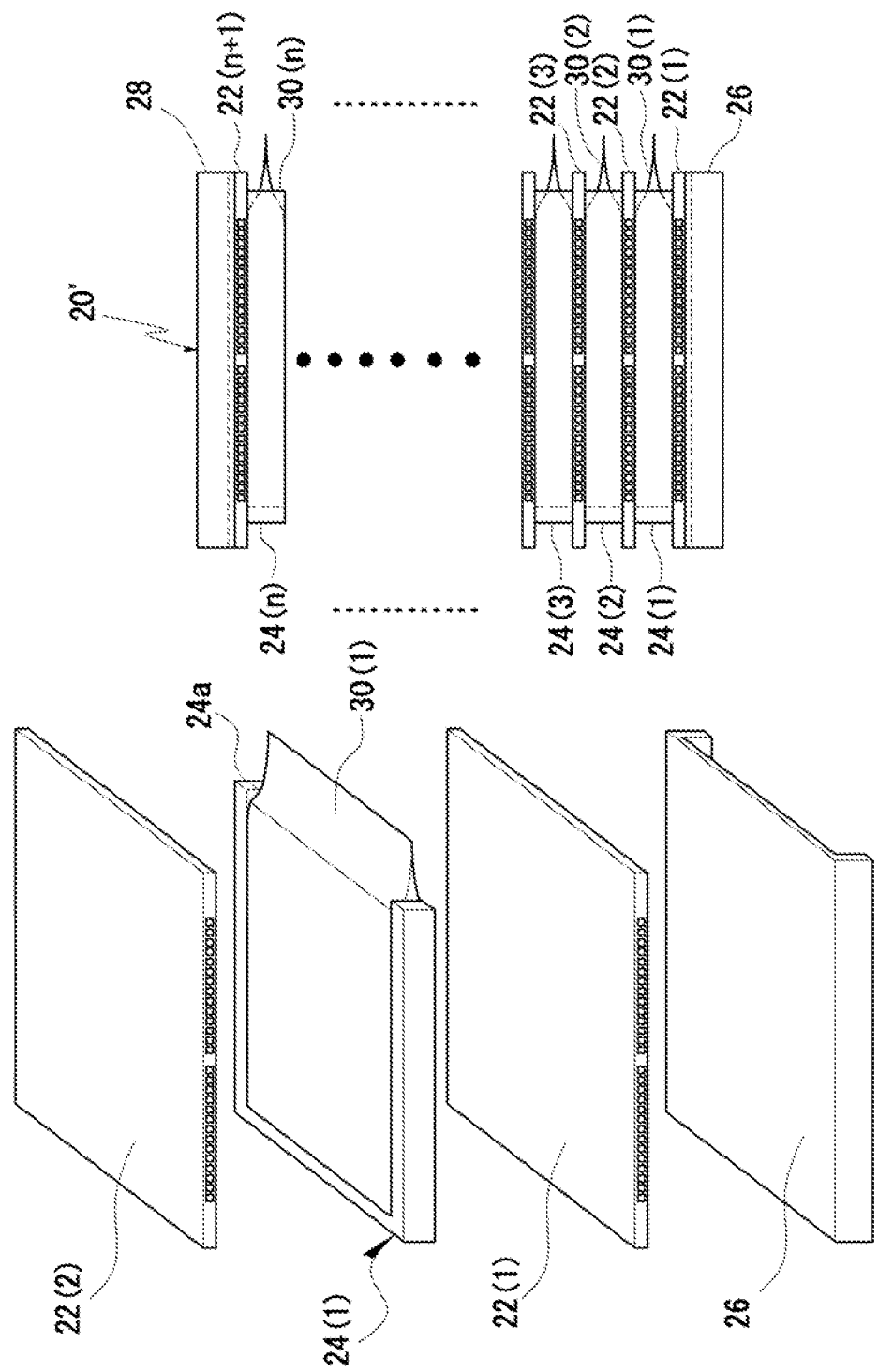

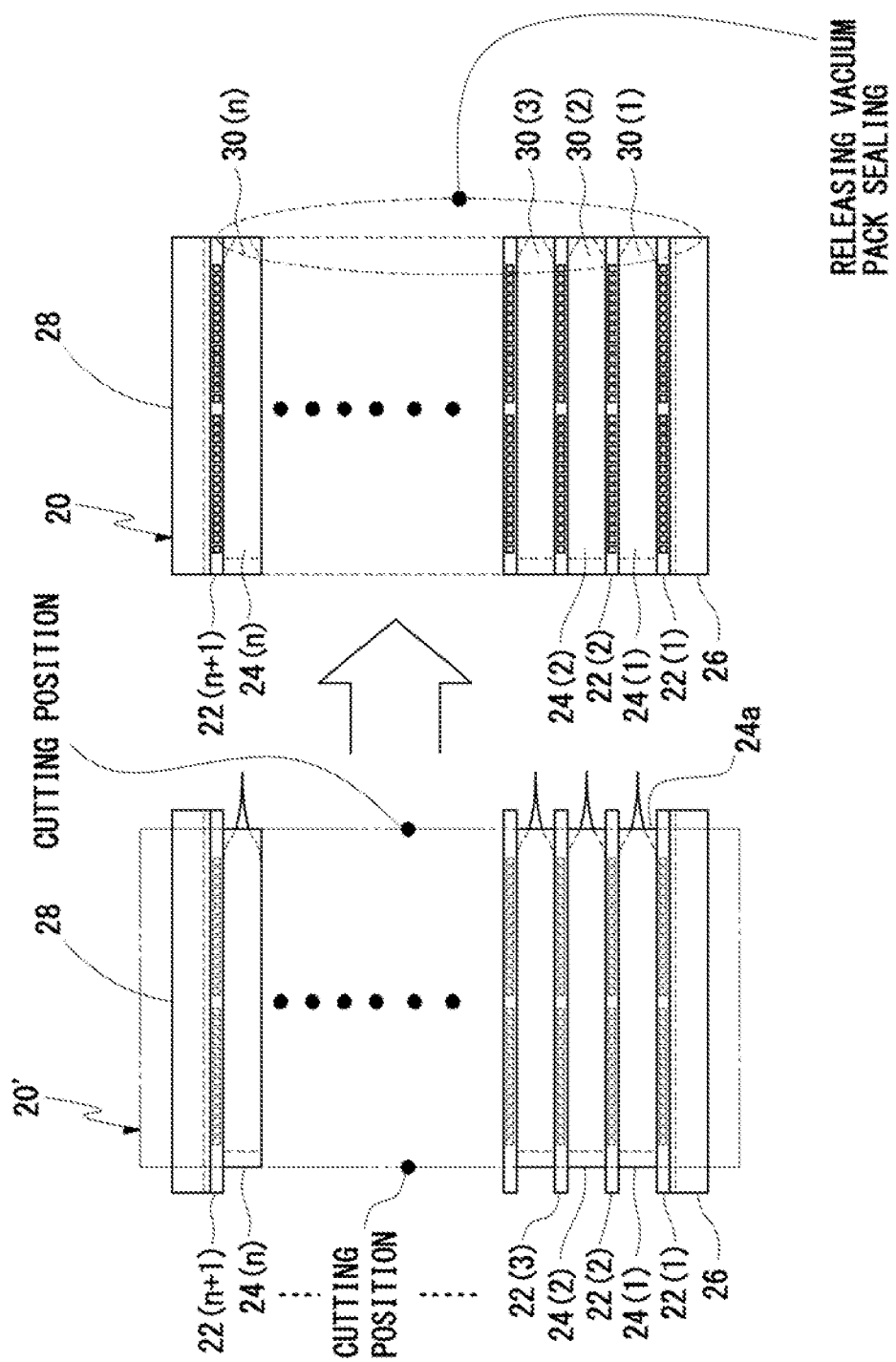

SOLID-GAS REACTION SUBSTANCE-FILLED REACTOR AND METHOD FOR MANUFACTURING THE SAME

FIELD OF THE INVENTION

The present invention relates to a solid-gas reaction substance-filled reactor and a method for manufacturing the same, more specifically, a solid-gas reaction substance-filled reactor that needs no filling operation of a solid-gas reaction substance into a reactor and allows the shortening of time for manufacturing the reactor and cost reduction, and a method for manufacturing the same.

BACKGROUND OF THE INVENTION

There are known various solid substances that are capable of reversibly absorbing and desorbing specific gases such as $H_2$, $CO_2$, and ammonia (hereinafter, collectively called "solid-gas reaction substance"). These solid-gas reaction substances release heat at the time of absorption and absorbs heat at the time of desorption. Accordingly, taking the advantage of these characteristics, the solid-gas reaction substances are utilized in:
(a) hydrogen storage/supply devices for reversibly absorbing and desorbing hydrogen;
(b) exhaust gas treatment devices for solid oxide fuel cells; and
(c) chemical heat storage devices for storing exhaust heat as chemical energy.

To absorb and desorb a gas using a solid-gas reaction substance, it is necessary to fill the solid-gas reaction substance in a container, and to equip the container with a mechanism for supplying and discharging a gas to and from the solid-gas reaction substance and a mechanism for heat exchange with the solid-gas reaction substance. Accordingly, there is a possibility of problems such as an increase in the size of device, complication of manufacturing processes, decrease in heat exchange efficiency between the solid-gas reaction substance and a heat medium, and others.

To solve these problems, there have been conventionally made various suggestions. For example, Patent Literature 1 discloses a method for manufacturing a hydrogen storage container including:
(a) stacking a heat medium-side fin, a plate, a hydrogen-side fin, and a plate in this order, attaching upper and lower shell plates to the upper and lower sides of the stacked body, and subjecting the stacked body to primary brazing to form a heat exchanger core;
(b) subjecting the side surfaces of the heat exchanger core to secondary brazing with side shell plates; and
(c) filling metal hydride powder into filling space of a metal hydride (between the plates).

The Patent Literature 1 describes that this method would decrease number of parts at the time of manufacture and shorten the manufacturing process.

In addition, Patent Literature 2 discloses a method for manufacturing a hydrogen storage container including:
(a) stacking a plate, a fin, a guide plate, and a breathable material in a predetermined order and attaching a shell plate to the outermost layer to form an assembly;
(b) subjecting the assembly to vacuum brazing to form a container body; and
(c) decompressing the space for storing metal hydride powder by a vacuum pump and filling the metal hydride powder into the space from a hydrogen inlet/outlet port.

The Patent Literature 2 describes that this method would simplify the manufacturing process.

As described in Patent Literature 1 and 2, the conventional hydrogen storage container is manufactured by producing a container body with a hydrogen gas flow path through vacuum brazing, and filling metal hydride powder into the hydrogen gas flow path in the completed container body. However, this method requires the filling operation of a metal hydride, which results in longer manufacturing period and increased manufacturing cost.

In the hydrogen storing container, the hydrogen gas flow path is generally narrowed or a fin is provided in the hydrogen gas flow path to enhance the heat exchange efficiency. Accordingly, it is necessary to fill a predetermined amount of metal hydride from the outside into the narrow hydrogen gas flow path, which would take a lot of time for filling operation. In addition, to ensure the filling volume of the metal hydride, it is necessary to provide the container for storing the metal hydride with high dimension accuracy.

CITATION LIST

Patent Literature

Patent Literature 1: Japanese Patent No. 4516462
Patent Literature 2: International Publication WO2008/023732

SUMMARY OF THE INVENTION

An object to be solved by the present invention is to provide a solid-gas reaction substance-filled reactor that needs no filling operation of a solid-gas reaction substance into the reactor, and a method for manufacturing the same.

Another object to be solved by the present invention is to provide a solid-gas reaction substance-filled reactor that allows the shortening of manufacturing period of the reactor and cost reduction, and a method for manufacturing the same.

To solve the foregoing objects, a solid-gas reaction substance-filled reactor according to the present invention is configured as follows:
(1) The solid-gas reaction substance-filled reactor includes:
  a core part in which first to (n+1)-th heat medium heat-transfer tubes (n≥1) with heat medium flow paths for flowing a heat medium and frame-shaped first to n-th spacers with opening ends for introducing and discharging a gas are alternately stacked along a z-axis direction such that the heat medium flow paths and the opening ends are each oriented in almost the same direction, and first and second core division walls are each arranged at both ends as seen in the z-axis direction;
  a gas introduction/discharge part that is joined to the core part in such a manner as to communicate with the opening ends of the first to n-th spacers; and
  a heat medium introduction/discharge part that is joined to the core part in such a manner as to communicate with the heat medium flow paths.
(2) The core part further includes the k-th filled body (1≤k≤n) that is inserted into a space surrounded by the k-th spacer (1≤k≤n), the k-th heat medium heat-transfer tube, and the (k+1)-th heat medium heat-transfer tube,
  the k-th filled body includes:
    a bag that is formed from metallic foil and is opened on the opening end side of the k-th spacer; and
    a solid-gas reaction substance filled in the bag.

(3) Brazing is applied at least between the k-th filled body ($1 \leq k \leq n$) and the k-th heat medium heat-transfer tube and between the k-th filled body and the (k+1)-th heat medium heat-transfer tube.

A method for manufacturing the solid-gas reaction substance-filled reactor according to the present invention includes the following steps:

(1) a first step of preparing first to n-th filled bodies ($n \geq 1$) in which a solid-gas reaction substance is filled into bag formed from metallic foil;

(2) a second step of placing a first brazing material sheet (A), a first heat medium heat-transfer tube with heat medium flow paths, a first brazing material sheet (B), and a frame-shaped first spacer with an opening end in this order on a first core division wall, and inserting the first filled body into the first spacer;

(3) when $n \geq 2$, a third step of alternately repeating:

a step of placing a (k+1)-th brazing material sheet (A), a (k+1)-th heat medium heat-transfer tube with heat medium flow paths, a (k+1)-th brazing material sheet (B), and a frame-shaped (k+1)-th spacer with an opening end in this order on a k-th spacer and a k-th filled body ($1 \leq k \leq n-1$) such that the heat medium flow paths are oriented in almost the same direction and the opening ends are oriented in almost the same direction, and a step of inserting the (k+1)-th filled body into the (k+1)-th spacer;

(4) a fourth step of placing the (n+1)-th brazing material sheet (A), the (n+1)-th heat medium heat-transfer tube with heat medium flow paths, the (n+1)-th brazing material sheet (B), and the second core division wall in this order on the n-th spacer and the n-th filled body such that the heat medium flow paths are oriented in almost the same direction to obtain a stacked body;

(5) a fifth step of melting the first to (n+1)-th brazing material sheets (A) and the first to (n+1)-th brazing material sheets (B) to braze between the members included in the stacked body to obtain a core part; and (6) a sixth step of joining a gas introduction/discharge part to the core part in such a manner as to communicate with the opening ends of the first to n-th spacers, and joining a heat medium introduction/discharge part to the core part in such a manner as to communicate with the heat medium flow paths of the first to (n+1)-th heat medium heat-transfer tubes.

First, a solid-gas reaction substance is filled into metallic bags to produce filled bodies. Next, heat medium heat-transfer tubes and spacers are stacked with brazing material sheets therebetween, and the filled bodies are inserted into the gaps in the spacers to obtain a stacked body. Melting the brazing material sheets in this state makes it possible to braze between the heat medium heat-transfer tubes and the spacers and between the heat medium heat-transfer tubes and the filled bodies by one heat treatment.

The thus obtained reactor has the solid-gas reaction substance already filled in the gas flow paths, which eliminates the need for a separate process to fill the solid-gas reaction substance. In addition, the core part can be obtained by one brazing treatment, which results in shortened manufacturing period. This achieves reduction in the manufacturing cost of the reactor.

BRIEF DESCRIPTION OF THE DRAWINGS

FIGS. 3A and 3B are a side view of a solid-gas reaction substance-filled reactor according to a first embodiment of the present invention (FIG. 3A) and a cross-sectional view of the same taken along line A-A' (FIG. 3B);

FIGS. 4A and 4B are a planar view of the solid-gas reaction substance-filled reactor illustrated in FIGS. 3A and 3B (FIG. 4A) and a planar view of the solid-gas reaction substance-filled reactor without manifold (FIG. 4B);

FIG. 9 is a schematic diagram illustrating a method for producing a filled body;

FIG. 10 is a perspective view of components of the solid-gas reaction substance-filled reactor;

FIG. 11 is a schematic diagram illustrating a stacking steps (second to fourth steps); and FIG. 12 is a schematic diagram illustrating a vacuum pack opening step (seventh step).

DETAILED DESCRIPTION OF PREFERRED EMBODIMENTS

An embodiment of the present invention will be described below in detail.

1. SOLID-GAS REACTION SUBSTANCE-FILLED REACTOR

A solid-gas reaction substance-filled reactor according to the present invention is configured as follows:

(1) The solid-gas reaction substance-filled reactor includes:

a core part in which first to (n+1)-th heat medium heat-transfer tubes ($n \geq 1$) with heat medium flow paths for flowing a heat medium and frame-shaped first to n-th spacers with opening ends for introducing and discharging a gas are alternately stacked along a z-axis direction such that the heat medium flow paths and the opening ends are each oriented in almost the same direction, and first and second core division walls are each arranged at both ends as seen in the z-axis direction;

a gas introduction/discharge part that is joined to the core part in such a manner as to communicate with the opening ends of the first to n-th spacers; and a heat medium introduction/discharge part that is joined to the core part in such a manner as to communicate with the heat medium flow paths.

(2) The core part further includes the k-th filled body ($1 \leq k \leq n$) that is inserted into a space surrounded by the k-th spacer (1≤k≤n), the k-th heat medium heat-transfer tube, and the (k+1)-th heat medium heat-transfer tube, the k-th filled body includes:
a bag that is formed from metallic foil and is opened on the opening end side of the k-th spacer; and
a solid-gas reaction substance filled in the bag.
(3) Brazing is applied at least between the k-th filled body (1≤k≤n) and the k-th heat medium heat-transfer tube and between the k-th filled body and the (k+1)-th heat medium heat-transfer tube.

1.1. CORE PART

Figure 1A:
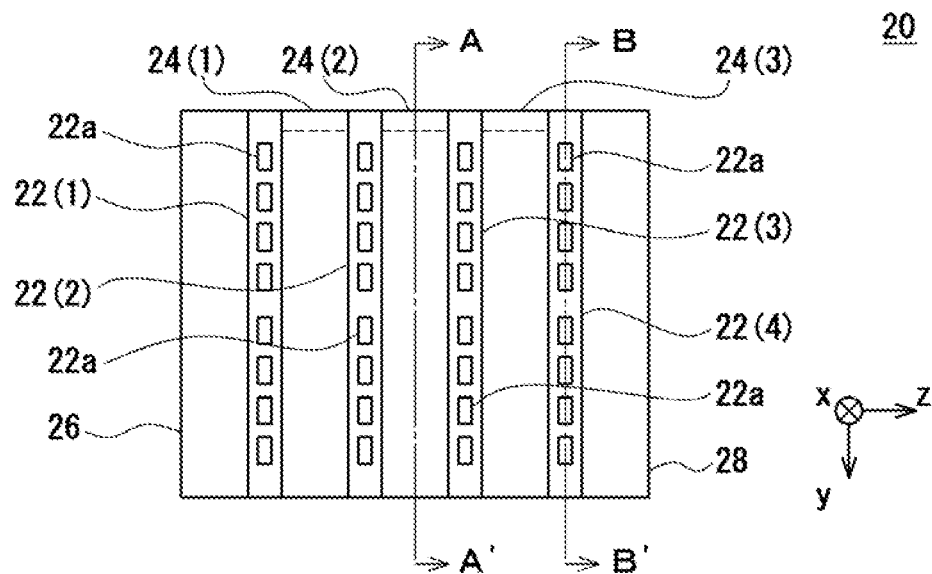
FIGS. 1A and 1B are planar view of a core part (FIG. 1A) and a front view of the same (FIG. 1B)
Figure 1B:
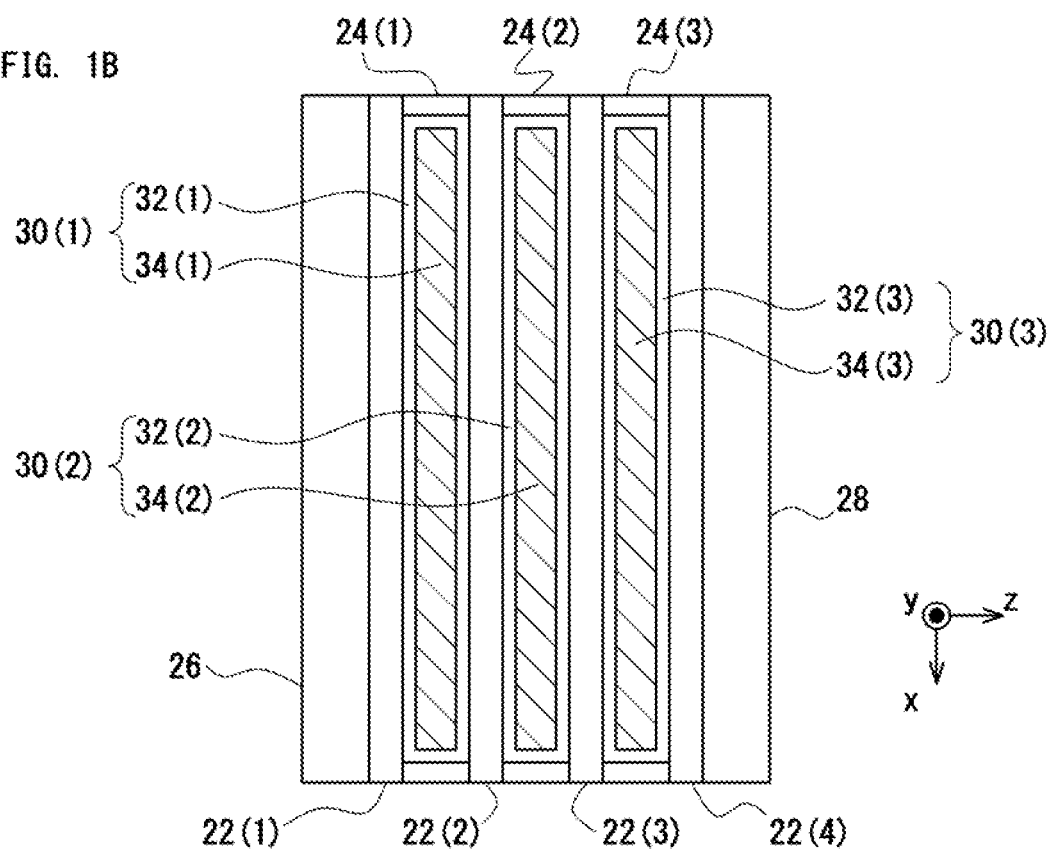
Figure 2B:
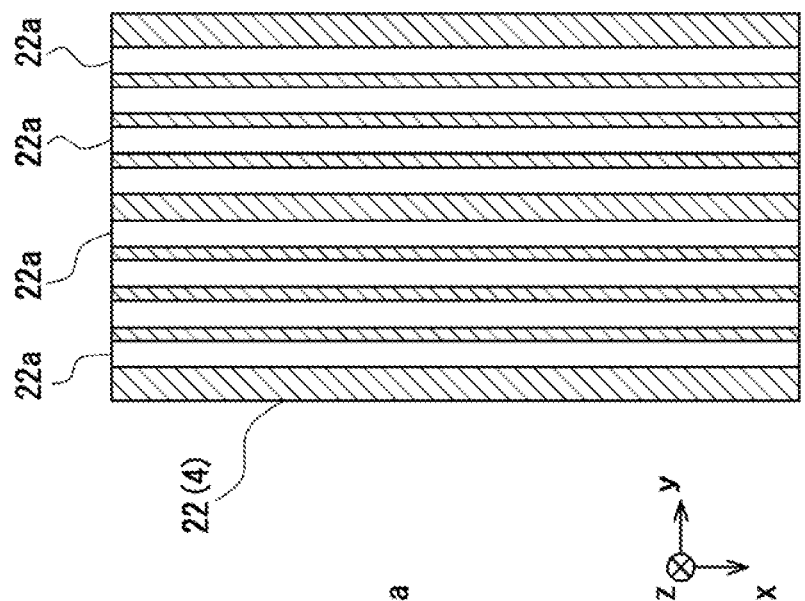
FIGS. 2A and 2B are cross-sectional view of the core part illustrated in FIG. 1A taken along line A-A' (FIG. 2A) and a cross-sectional view of the same taken along line B-B' (FIG. 2B)
Figure 2A:
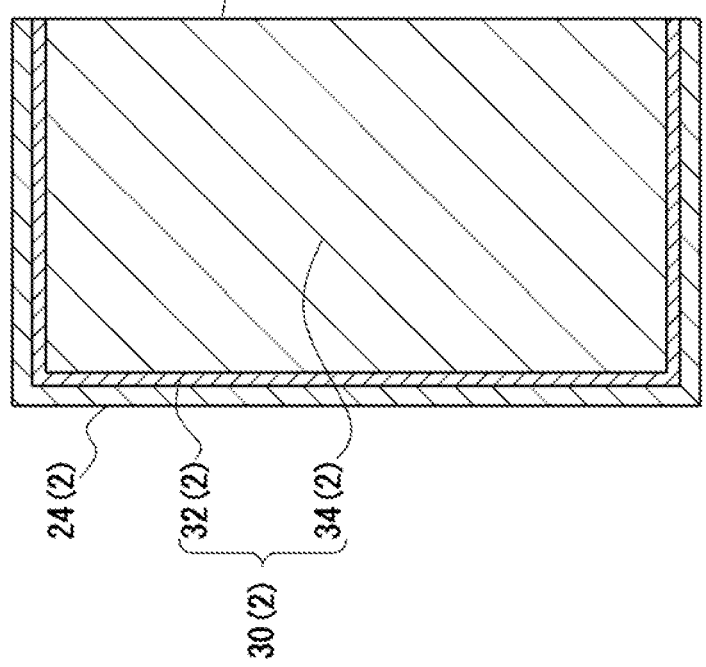

FIGS. 1A and 1B show a planar view of a core part (FIG. 1A) and a front view of the same (FIG. 1B). FIGS. 2A and 2B show a cross-sectional view of the core part illustrated in FIG. 1A taken along line A-A' (FIG. 2A) and a cross-sectional view of the same taken along line B-B' (FIG. 2B).

Referring to FIGS. 1A, 1B, 2A, and 2B, a core part 20 is structured such that first to fourth heat medium heat-transfer tubes 22(1) to 22(4) with heat medium flow paths 22a, 22a, . . . for flowing a heat medium and frame-shaped first to third spacers 24(1) to 24(3) with opening ends 24a for introducing and discharging a gas are alternately stacked along a z-axis direction.

The first to fourth heat medium heat-transfer tubes 22(1) to 22(4) are stacked such that the heat medium flow paths 22a, 22a, . . . are oriented in almost the same direction. Similarly, the first to third spacers 24(1) to 24(3) are stacked such that the opening ends 24a are oriented in almost the same direction. A first core division wall 26 and a second core division wall 28 are arranged at both ends of the core part 20 as seen in the z-axis direction.

Further, first to third filled bodies 30(1) to 30(3) are inserted into spaces in the first to third spacers 24(1) to 24(3).

In the present invention, the term "z-axis direction" means not "vertical direction" but the stacking direction of constituent elements of the core part 20.

In FIGS. 1A, 1B, 2A, and 2B, the term "x-axis direction" means the flowing direction of a heat medium, and the term "y-axis direction" means the flowing direction of a gas. In FIGS. 1A, 1B, 2A, and 2B, the x axis, the y axis, and the z axis are orthogonal to one another. However, this is a mere example but the three axes may not be necessarily orthogonal to one another as far as a heat medium and a gas can be introduced and discharged along these axes. As described later, for example, both a gas and a heat medium may flow in the y-axis direction.

The phrase "the heat medium flow paths are oriented in almost the same direction" means that the heat medium heat-transfer tubes 22 are arranged such that a heat medium can be introduced and discharged at the same time through the plurality of heat medium flow paths 22a. Therefore, the heat medium flow paths 22a, 22a, . . . may not be necessarily in complete parallel with one another.

Similarly, the phrase "the opening ends are oriented in almost the same direction" means that the spacers 24 are arranged such that a gas can be introduced and discharged at the same time through the plurality of filled bodies 30.

Further, FIGS. 1A and 1B illustrate a total of three spacers 24 and filled bodies 30, but this is a mere example. The optimum number (n) of the spacers 24 and the filled bodies 30 can be selected according to the purpose.

1.1.1. Heat Medium Heat-Transfer Tube

[A. Structure]

The k-th heat medium heat-transfer tube 22(k) (1≤k≤n+1) is intended to exchange heat with the k-th filled body 30(k) (1≤k≤n). There is no particular limitation on the shape of the k-th heat medium heat-transfer tube 22(k) as far as it allows introduction and discharge of a heat medium. For example, the k-th heat medium heat-transfer tube 22(k) may be configured such that the heat medium flow paths 22a, 22a, . . . penetrate from one end to the other end of the k-th heat medium heat-transfer tube 22(k) or may turn around in the k-th heat medium heat-transfer tube 22(k). In the example illustrated in FIGS. 1A and 1B, the k-th heat medium heat-transfer tube 22(k) is flat plate-shaped and include a plurality of heat medium flow paths 22a, 22a, . . . that penetrates from one end to the other end of the k-th heat medium heat-transfer tube 22(k) along the x-axis direction.

When the heat medium flow paths 22a penetrate from one end to the other end of the k-th heat medium heat-transfer tube 22(k), a heat medium can be flown into the flow paths by various methods. Examples of methods for flowing a heat medium include:
(a) a method in which the plurality of heat medium flow paths 22a, 22a, . . . in the same k-th heat medium heat-transfer tube 22(k) is divided into two groups so that the heat medium discharged from one group is turned around toward the other group;
(b) a method in which the heat medium is flown from one end to the other end of all the heat medium flow paths 22a, 22a, . . . ; and
(c) a method in which the heat medium is flown into all the heat medium flow paths 22a, 22a, . . . in the k-th heat medium heat-transfer tube 22(k) in the +x-axis direction, and the heat medium is flown into all the heat medium flow paths 22a, 22a, . . . in the adjacent (k+1)-th heat medium heat-transfer tube 22(k+1) in the −x-axis direction.

[B. Material]

As described later, the k-th heat medium heat-transfer tube 22(k) is brazed to the adjacent k-th spacer 24(k), the first core division wall 26, the second core division wall 28, or the k-th filled body 30(k). Accordingly, there is no particular limitation on the material for the k-th heat medium heat-transfer tube 22(k) as far as it has thermal resistance at the brazing temperature and the operational temperature and it can be brazed to the adjacent members. To perform brazing in an easy manner, the material for the k-th heat medium heat-transfer tube 22(k) is preferably the same kind as those for the adjacent members.

Examples of the material for the k-th heat medium heat-transfer tube 22(k) include Al alloy, stainless steel, titanium alloy, copper alloy, and others.

[C. Heat Medium]

There is no particular limitation on the heat medium for heat exchange with the solid-gas reaction substance. Examples of the heat medium include water, long-life coolant (LLC), heat transfer oil, and others.

1.1.2. Spacer

[A. Structure]

The k-th spacer 24(k) (1≤k≤n) constitutes a division wall for a space where the k-th filled body 30(k) is stored after brazing. There is no particular limitation on the shape of the k-th spacer 24(k) as far as it includes an opening end 24a for introducing and discharging a gas and it allows insertion of the k-th filled body 30(k).

In the example illustrated in FIGS. 1A and 1B, the k-th spacer 24(k) is angular U-shaped and is joined between the k-th heat medium heat-transfer tube 22(k) and the (k+1)-th heat medium heat-transfer tube 22(k+1) such that the opening end 24a is oriented in the y-axis direction.

[B. Material]

There is also no particular limitation on the material for the k-th spacer 24(k) as far as it has thermal resistance at the brazing temperature and the operational temperature and it can be brazed to the adjacent members. To perform brazing in an easy manner, the material for the k-th spacer 24(k) is preferably the same kind as those for the adjacent members.

1.1.3. Core Division Walls

[A. Structure]

The first core division wall 26 and the second core division wall 28 are intended to keep the strength of the core part 20 and are arranged on the both ends of the core part 20 as seen in the z-axis direction. There is no particular limitation on the structures of the first core division wall 26 and the second core division wall 28 as far as they ensure required strength.

[B. Material]

There is also no particular limitation on the material for the first core division wall 26 and the second core division wall 28 as far as they have thermal resistance at the brazing temperature and the operational temperature and they can be brazed to the adjacent members. To perform brazing in an easy manner, the material for the first core division wall 26 and the second core division wall 28 is preferably the same kind as those for the adjacent members.

1.1.4. Filled Body

The core part 20 further includes the k-th filled body 30(k) (1≤k≤n) inserted into a space surrounded by the k-th spacer 22(k) (1≤k≤n), the k-th heat medium heat-transfer tube 24(k), and the (k+1)-th heat medium heat-transfer tube 24(k+1).

The k-th filled body 30(k) includes:

a bag 32(k) that is formed from metallic foil and is opened on the opening end 24a side of the k-th spacer 22(k); and a solid-gas reaction substance 34(k) filled into the bag 32(k).

[A. Bag]

The bag 32(k) is intended to fill the solid-gas reaction substance 34(k). The solid-gas reaction substance 34(k) is not filled in the bag 32(k) afterwards but is already filled in the bag 32(k) at the time of completion of brazing of the core part 20. This point is different from the conventional technique.

The k-th filled body 30(k) may have one end of the bag 32(k) opened from the beginning or may constitute a vacuum pack in which the solid-gas reaction substance 34(k) is vacuum-sealed. In the latter case, after completion of brazing of the core part 20, the vacuum pack is opened before joint of the gas introduction/discharge part. This will be described later.

There is no particular limitation on the shape of the bag 32(k) as far as it can be filled with the solid-gas reaction substance 34(k). To improve heat transfer between the k-th heat medium heat-transfer tube 22(k) and the (k+1)-th heat medium heat-transfer tube 22(k+1), the bag 32(k) is preferably in the shape close contact with a space surrounded by the k-th spacer 22(k) (1≤k≤n), the k-th heat medium heat-transfer tube 24(k), and the (k+1)-th heat medium heat-transfer tube 24(k+1). The bag 32(k) may contain a heat transfer fin to improve heat transfer between the solid-gas reaction substance 34(k) and the k-th heat medium heat-transfer tube 22(k).

The k-th filled body 30(k) is brazed to the adjacent k-th heat medium heat-transfer tube 22(k) and (k+1)-th heat medium heat-transfer tube 22(k+1). Accordingly, metallic foil is used for the bag 32(k). There is also no particular limitation on the material for the bag 32(k) as far as it has thermal resistance at the brazing temperature and the operational temperature and it can be brazed to the adjacent members. To perform brazing in an easy manner, the material for the bag 32(k) is preferably the same kind as those for the adjacent members.

[B. Solid-Gas Reaction Substance]

In the present invention, there is no limitation on the kinds of the solid-gas reaction substance 34(k) and a gas to react with this. Examples of the solid-gas reaction substance 34(k) include:

(a) $H_2$ absorbers that absorb and desorb hydrogen, such as metal hydrides, complex hydrides, and carbon-based or inorganic-based porous materials;

(b) $CO_2$ absorbers that absorb and desorb $CO_2$, such as $CaCO_3$ and $Li_4SiO_4$;

(c) $NH_3$ absorbers that absorb and desorb $NH_3$, such as zeolite, activated carbon, and metallic halides; and (d) steam absorbers that absorb and desorb steam, such as $Ca(OH)_2$ and $Mg(OH)_2$.

In addition, various additives other than the solid-gas reaction substance 34(k) may be included in the bag 32(k). Examples of the additives include heat conduction aids such as carbon fiber, copper or copper alloy powder, and aluminum or aluminum alloy powder.

1.2. GAS INTRODUCTION/DISCHARGE PART

The gas introduction/discharge part is joined to the core part 20 in such a manner as to communicate with the opening ends 24a of the first to n-th spacers 24(1) to 24(n). The gas introduction/discharge part supplies a gas to the solid-gas reaction substance 34 and discharges a gas desorbed from the solid-gas reaction substance 34 to the outside. There is no particular limitation on the structure of the gas introduction/discharge part as far as it has the function described above.

The solid-gas reaction substance 34 is generally used in powder form. Accordingly, the gas introduction/discharge portion is preferably provided with a filter to prevent the scattering of the solid-gas reaction substance 34.

1.3. HEAT MEDIUM INTRODUCTION/DISCHARGE PART

A heat medium introduction/discharge part is joined to the core part 20 in such a manner as to communicate with the heat medium flow paths 22a, 22a, . . . . The heat medium introduction/discharge part introduces and discharges a heat medium into and from the heat medium flow paths 22a, 22a, . . . . There is no particular limitation on the structure of the heat medium introduction/discharge part as far as it has the function described above.

1.4. SPECIFIC EXAMPLES

1.4.1. Specific Example 1

FIGS. 3A and 3B show a side view of the solid-gas reaction substance-filled reactor according to the first embodiment of the present invention (FIG. 3A) and a cross-sectional view of the same taken along line A-A' (FIG. 3B). FIGS. 4A and 4B show a planar view of the solid-gas reaction substance-filled reactor illustrated in FIGS. 3A and 3B (FIG. 4A) and a planar view of the solid-gas reaction substance-filled reactor without manifold (FIG. 4B). Referring to FIGS. 3A, 3B, 4A, and 4B, a solid-gas reaction substance-filled reactor 10a includes the core part 20, a gas introduction/discharge part 40, and a heat medium introduction/discharge part 50a.

The core part 20 includes the k-th heat medium heat-transfer tube 22(k) (1≤k≤n+1). The k-th heat medium heat-transfer tube 22(k) includes a plurality of heat medium flow paths 22a, 22a, ... that penetrates from one end to the other end of the k-th heat medium heat-transfer tube 22(k). As illustrated in FIG. 4B, the four corners of the core part 20 are cut according to the shape of the heat medium introduction/discharge part 50a. The other features of the core part 20 are described above and thus duplicated descriptions will be omitted here.

The gas introduction/discharge part 40 includes a cover 42 and a filter 44. The cover 42 covers the opening ends 24a of the spacers 24 included in the core part 20 (that is, the opening ends of the filled bodies 30) and is connected to the gas introduction/discharge surface side of the core part 20. The cover 42 has a joint 42a in the center to connect with a gas supply source or a gas consumption source.

The cover 42 has the filter 44 at the opening end side (the core part 20 side) in such a manner as to cover the opening ends 24a of the spacers 24. The filter 44 prevents the scattering of the solid-gas reaction substance 34 filled in the filled bodies 30.

The heat medium introduction/discharge part 50a includes a manifold 52 with a heat medium inlet 52a and a heat medium outlet 52b, and a header 54. The manifold 52 is connected to the core part 20 in such a manner as to communicate with first ends of the heat medium flow paths 22a, 22a, .... The header 54 is connected to the core part 20 in such a manner as to communicate with second ends of the heat medium flow paths 22a, 22a, ....

The manifold 52 distributes the heat medium supplied from the inlet 52a to the first to (n+1)-th heat medium heat-transfer tubes 22(1) to 22(n+1), and supplies the distributed heat medium to some of the heat medium flow paths 22a, 22a, ... included in the k-th heat medium heat-transfer tube 22(k) (1≤k≤n+1). On the other hand, the header 54 causes the heat medium discharged from some of the heat medium flow paths 22a, 22a, ... to turn around toward the remaining heat medium flow paths 22a, 22a, ... and discharges the same from the outlet 52b.

1.4.2. Specific Example 2

Figure 5A:
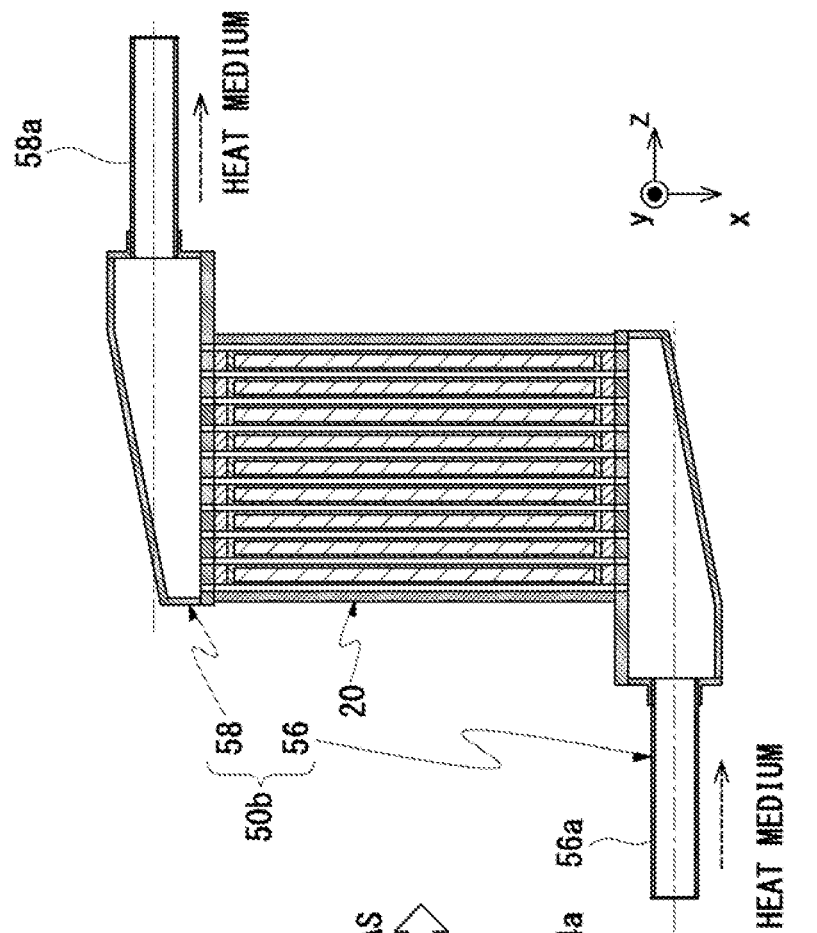
FIGS. 5A and 5B are a side view of a solid-gas reaction substance-filled reactor according to a second embodiment of the present invention (FIG. 5A) and a cross-sectional view of the same taken along line A-A' (FIG. 5B)
Figure 5B:
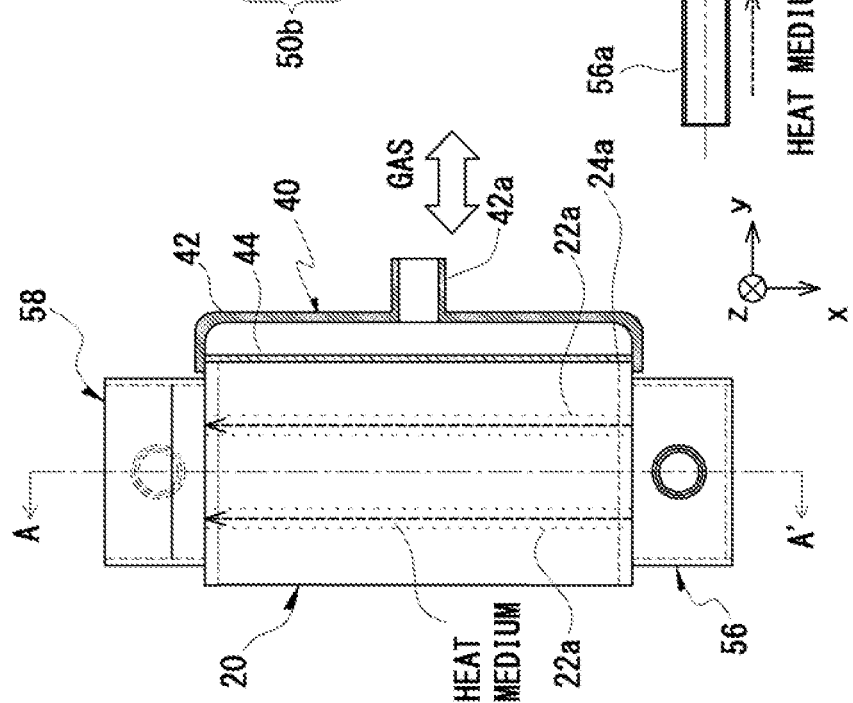

FIGS. 5A and 5B show a side view of a solid-gas reaction substance-filled reactor according to a second embodiment of the present invention (FIG. 5A) and a cross-sectional view of the same taken along line A-A' (FIG. 5B).

Referring to FIGS. 5A and 5B, a solid-gas reaction substance-filled reactor 10b includes a core part 20, a gas introduction/discharge part 40, and a heat medium introduction/discharge part 50b.

The heat medium introduction/discharge part 50b includes a first manifold 56 with a heat medium inlet 56a and a second manifold 58 with a heat medium outlet 58a. The first manifold 56 is connected to the core part 20 in such a manner as to communicate with first ends of the heat medium flow paths 22a, 22a, .... The second manifold 58 is connected to the core part 20 in such a manner as to communicate with second ends of the heat medium flow paths 22a, 22a, ....

The first Manifold 56
distributes the heat medium supplied from the inlet 56a to the first to (n+1)-th heat medium heat-transfer tubes 22(1) to 22(n+1), and
supplies the distributed heat medium to all the heat medium flow paths 22a, 22a, ... included in the first to (n+1)-th heat medium heat-transfer tubes 22(1) to 22(n+1) in the same direction.

The second manifold 58 discharges from the outlet 58a the heat medium discharged from the heat medium flow paths 22a, 22a, ....

The other features are the same as those in the first embodiment and thus descriptions thereof will be omitted here.

The solid-gas reaction substance-filled reactor 10b according to the present embodiment has the cross-section area of the heat medium flow path twice larger than that in the first embodiment. Accordingly, the flow velocity of the heat medium becomes lower to decrease the heat transfer coefficient. However, the pressure loss is smaller than that in the first embodiment. Accordingly, the present embodiment is suited for use applications in which a lower pressure loss takes precedence over an improved heat transfer coefficient.

1.4.3. Specific Example 3

Figures 6A, 6B:
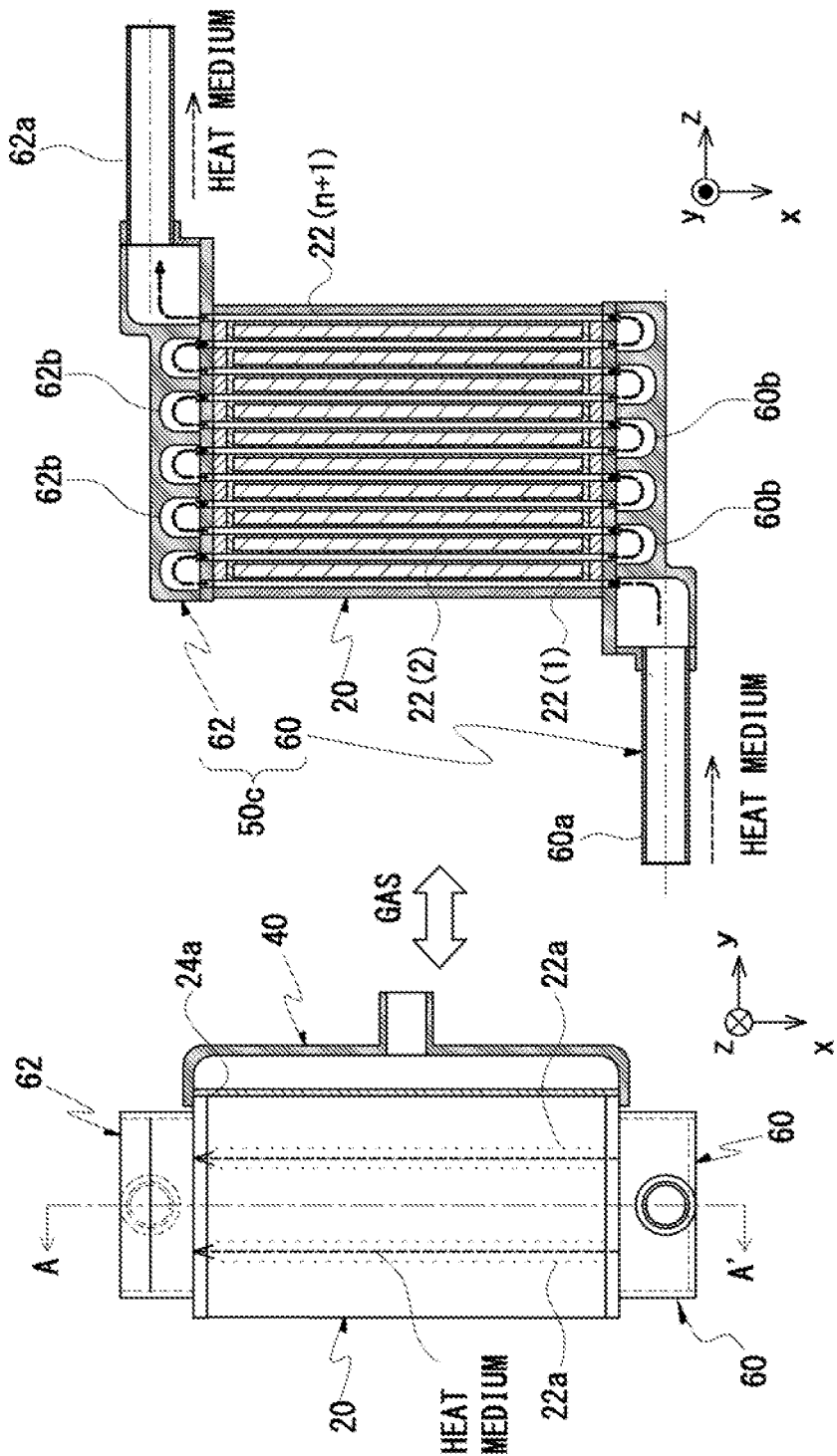
FIGS. 6A and 6B are a side view of a solid-gas reaction substance-filled reactor according to a third embodiment of the present invention (FIG. 6A) and a cross-sectional view of the same taken along line A-A' (FIG. 6B)

FIGS. 6A and 6B show a side view of a solid-gas reaction substance-filled reactor according to a third embodiment of the present invention (FIG. 6A) and a cross-sectional view of the same taken along line A-A' (FIG. 6B).

Referring to FIGS. 6A and 6B, a solid-gas reaction substance-filled reactor 10c includes a core part 20, a gas introduction/discharge part 40, and a heat medium introduction/discharge part 50c.

The heat medium introduction/discharge part 50c includes a first manifold 60 with a heat medium inlet 60a and a second manifold 62 with a heat medium outlet 62a. The first manifold 60 is connected to the core part 20 in such a manner as to communicate with first ends of the heat medium flow paths 22a, 22a, .... The second manifold 62 is connected to the core part 20 in such a manner as to communicate with second ends of the heat medium flow paths 22a, 22a, ....

Each of the first manifold 60 and the second manifold 62 connects in series the heat medium flow paths 22a, 22a, ... included in the k-th heat medium heat-transfer tube 22(k) and the heat medium flow paths 22a, 22a, ... included in the (k+1)-th heat medium heat-transfer tube 22(k+1) such that (a) the heat medium flows in the +x-axis direction in the heat medium flow paths 22a, 22a, ... included in the k-th heat medium heat-transfer tube 22(k), and (b) the heat medium flows in the −x-axis direction in the heat medium flow paths 22a, 22a, ... included in the (k+1)-th heat medium heat-transfer tube 22(k+1).

Accordingly, the first manifold 60 has concave portions 60b, 60b, ... to turn the heat medium around. Similarly, the second manifold 62 has concave portions 62b, 62b ... to turn the heat medium around.

The other features are the same as those in the first embodiment and thus descriptions thereof will be omitted here.

In the solid-gas reaction substance-filled reactor 10c illustrated in FIG. 6B, when a heat medium is supplied to the inlet 60a of the first manifold 60, the heat medium flows in the order of the first heat medium heat-transfer tube 22(1), the second heat medium heat-transfer tube 22(2), . . . , and the (n+1)-th heat medium heat-transfer tube 22(n+1). The heat medium having passed through the (n+1)-th heat medium heat-transfer tube 22(n+1) is discharged from the outlet 62a.

In the solid-gas reaction substance-filled reactor 10c according to the present embodiment, the heat medium turns around in the upper and lower sides of all the heat medium flow paths 22a, 22a, . . . . The present embodiment has the significantly decreased cross-section area of the heat medium flow path as compared to that in the first embodiment, which provides the maximum flow velocity and a higher heat transfer coefficient. However, the pressure loss significantly increases as compared to that in the first embodiment. Accordingly, the present embodiment is suited for use applications in which an improved heat transfer coefficient takes precedence over a lower pressure loss.

1.4.4. Specific Example 4

Figure 7B:
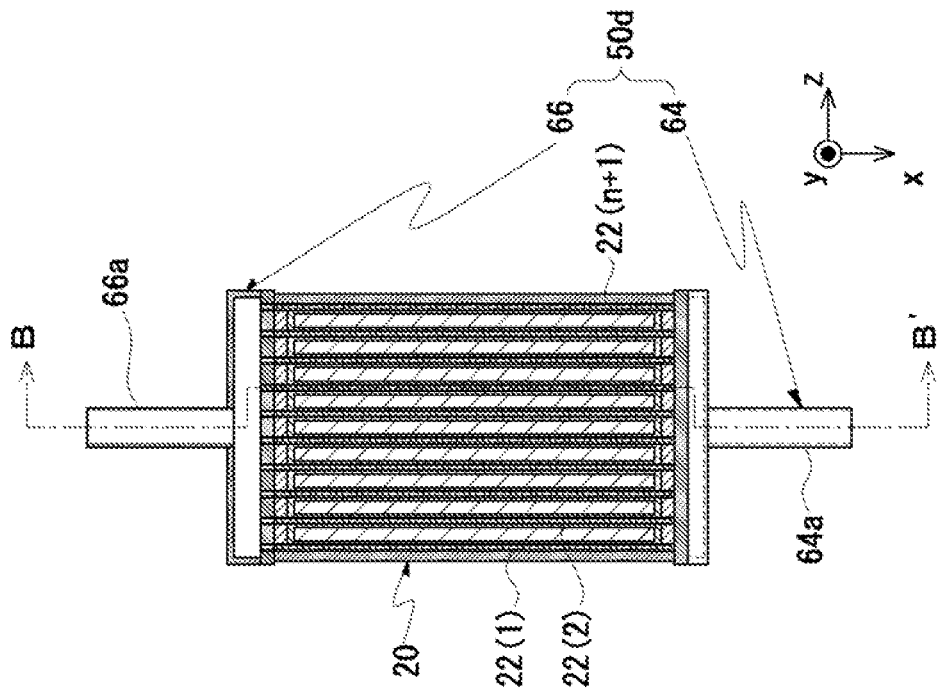
FIGS. 7A and 7B are a side view of a solid-gas reaction substance-filled reactor according to a fourth embodiment of the present invention (FIG. 7A) and a cross-sectional view of the same taken along line A-A' (FIG. 7B)
Figure 7A:
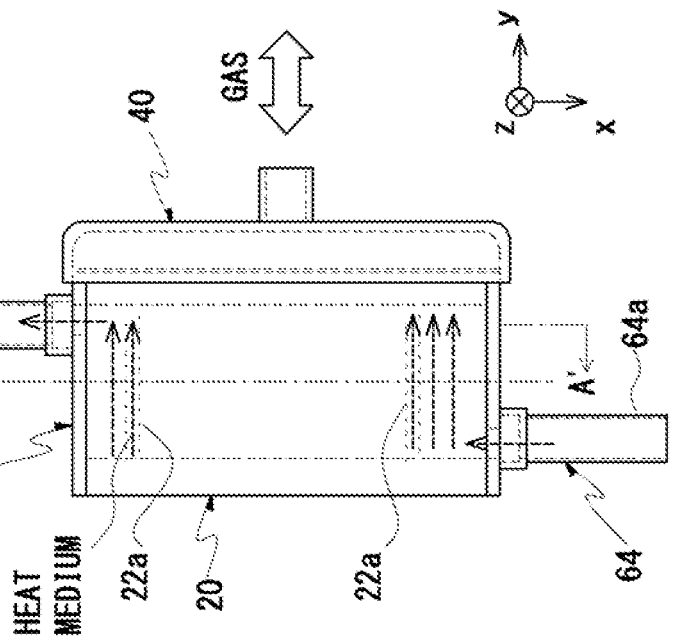
Figure 8A:
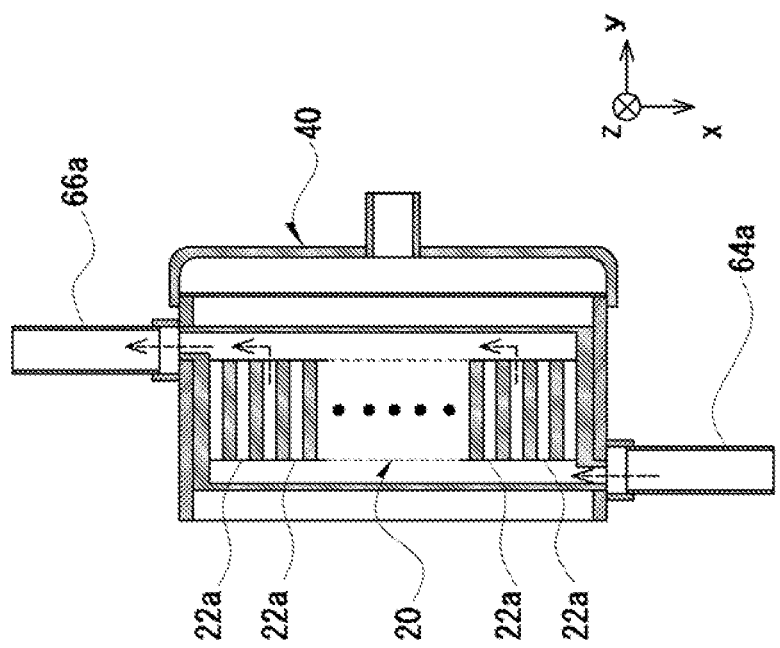
FIGS. 8A and 8B are a cross-sectional view of the solid-gas reaction substance-filled reactor illustrated in FIG. 7B taken along line B-B' (FIG. 8A) and a planar view of the same (FIG. 8B)
Figure 8B:
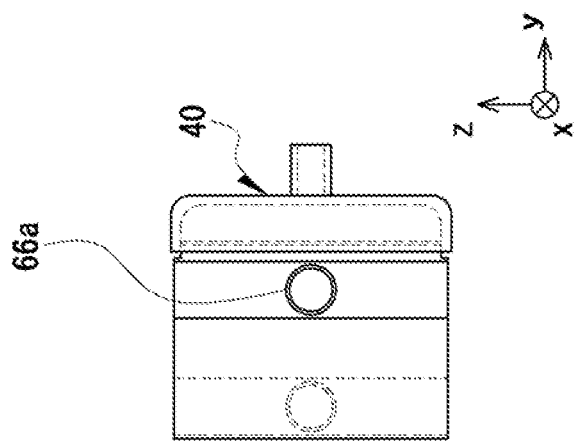

FIGS. 7A and 7B show a side view of a solid-gas reaction substance-filled reactor according to a fourth embodiment of the present invention (FIG. 7A) and a cross-sectional view of the same taken along line A-A' (FIG. 7B). FIGS. 8A and 8B show a cross-sectional view of the solid-gas reaction substance-filled reactor illustrated in FIG. 7B taken along line B-B' (FIG. 8A) and a planar view of the same (FIG. 8B). FIG. 8A shows a partial enlarged diagram for increased visibility.

Referring to FIGS. 7A, 7B, 8A, and 8B, a solid-gas reaction substance-filled reactor 10d includes a core part 20, a gas introduction/discharge part 40, and a heat medium introduction/discharge part 50d.

In the present embodiment, the core part 20 includes first to (n+1)-th heat medium heat-transfer tubes 22(1) to 22(n+1). Each of the first to (n+1)-th heat medium heat-transfer tubes 22(1) to 22(n+1) includes a plurality of heat medium flow paths 22a, 22a, . . . that penetrates from one end to the other end of the heat medium heat-transfer tube. The heat medium flow paths 22a, 22a, . . . are arranged such that the flowing direction of the heat medium is almost the same as the flowing direction of the gas. This point is different from the first embodiment.

The other features of the core part 20 and the gas introduction/discharge part 40 are the same as those in the first embodiment and thus descriptions thereof will be omitted.

The heat medium introduction/discharge part 50d includes a first manifold 64 with a heat medium inlet 64a and a second manifold 66 with a heat medium outlet 66a. The first manifold 64 is connected to the core part 20 in such a manner as to communicate with first ends of the heat medium flow paths 22a, 22a, . . . . The second manifold 66 is connected to the core part 20 in such a manner as to communicate with second ends of the heat medium flow paths 22a, 22a, . . . .

The first manifold 64 distributes the heat medium supplied from the inlet 64a to the first to (n+1)-th heat medium heat-transfer tubes 22(1) to 22(n+1), and supplies the distributed heat medium to all the heat medium flow paths 22a, 22a, . . . included in the first to (n+1)-th heat medium heat-transfer tubes 22(1) to 22(n+1) in the same direction.

The second manifold 66 discharges from the outlet 66a the heat medium discharged from the heat medium flow paths 22a, 22a, . . . .

As illustrated in FIGS. 7A, 7B, 8A, and 8B, when the flowing direction of a gas and the flowing direction of a heat medium in the core part 20 are both aligned with the y-axis direction and the first manifold 64 and the second manifold 66 are to be connected to a plane vertical to the x-axis, the first manifold 64 needs a mechanism that distributes the heat medium supplied from the x-axis direction to the heat medium flow paths 22a, 22a, . . . oriented in the y-axis direction. Similarly, the second manifold 66 needs a mechanism that collects the heat medium discharged in the y-axis direction and discharges the same in the x-axis direction (see FIG. 8A). Accordingly, the present embodiment is more complicated in structure than the first embodiment. However, the present embodiment can be made smaller in size than the first embodiment and thus is suited for use applications with restrictions on installation site.

2. METHOD FOR MANUFACTURING THE SOLID-GAS REACTION SUBSTANCE-FILLED REACTOR

A method for manufacturing the solid-gas reaction substance-filled reactor according to the present invention includes the following steps:

(1) a first step of preparing first to n-th filled bodies (n≥1) in which a solid-gas reaction substance is filled into bag formed from metallic foil;

(2) a second step of placing a first brazing material sheet (A), a first heat medium heat-transfer tube with heat medium flow paths, a first brazing material sheet (B), and a frame-shaped first spacer with an opening end in this order on a first core division wall, and inserting the first filled body into the first spacer;

(3) when n≥2, a third step of alternately repeating:

a step of placing a (k+1)-th brazing material sheet (A), a (k+1)-th heat medium heat-transfer tube with heat medium flow paths, a (k+1)-th brazing material sheet (B), and a frame-shaped (k+1)-th spacer with an opening end in this order on a k-th spacer and a k-th filled body (1≤k≤n−1) such that the heat medium flow paths are oriented in almost the same direction and the opening ends are oriented in almost the same direction, and a step of inserting the (k+1)-th filled body into the (k+1)-th spacer;

(4) a fourth step of placing the (n+1)-th brazing material sheet (A), the (n+1)-th heat medium heat-transfer tube with heat medium flow paths, the (n+1)-th brazing material sheet (B), and the second core division wall in this order on the n-th spacer and the n-th filled body such that the heat medium flow paths are oriented in almost the same direction to obtain a stacked body;

(5) a fifth step of melting the first to (n+1)-th brazing material sheets (A) and the first to (n+1)-th brazing material sheets (B) to braze between the members included in the stacked body to obtain a core part; and (6) a sixth step of joining a gas introduction/discharge part to the core part in such a manner as to communicate with the opening ends of the first to n-th spacers, and joining a heat medium introduction/discharge part to the core part in such a manner as to communicate with the heat medium flow paths of the first to (n+1)-th heat medium heat-transfer tubes.

2.1. FIRST STEP (PRODUCTION OF THE FILLED BODIES)

First, the first to n-th filled bodies (n≥1) with a solid-gas reaction substance filled into metal foil bag are prepared (the first step).

There is no particular limitation on the method for producing the filled bodies. FIG. 9 shows one example of the methods for producing the filled bodies. The metallic foil bag 32 is inserted into the restraint frame 70. In this state, a prescribed amount of solid-gas reaction substance (for example, a metal hydride mixed with carbon fiber) is filled into the bag 32. In this case, the solid-gas reaction substance may be powder or a molded body. In the case of filling powder, the restraint frame 70 may be tapped to increase the packing density of the powder.

Next, the restraint frame 70 is changed to a horizontal posture and is vacuumed and sealed by a vacuum sealer. At the time of vacuuming, a load may be applied from the opening end to the inside of the restraint frame 70 to facilitate degassing. After sealing, the vacuum-sealed filled body (vacuum pack) 30 is taken out of the restraint frame 70.

Although not necessarily required, vacuum sealing makes it possible to suppress the scattering and deterioration of the solid-gas reaction substance at the time of brazing.

2.2. THE SECOND TO FOURTH STEPS (PRODUCTION OF THE STACKED BODY)

2.2.1. Production of the Components

FIG. 10 shows a perspective view of the components of the solid-gas reaction substance-filled reactor (hereinafter, also simply called "reactor"). First, the heat medium heat-transfer tubes 22, the spacers 24, the first core division wall 26, and the second core division wall (not illustrated) are produced in specific shapes.

The dimensions of the components may be the same as or larger than the dimensions of the same after the completion of the reactor. In the example of FIG. 10, the dimensions of the spacers 24 are almost the same as those after the completion. On the other hand, the dimensions of the heat medium heat-transfer tubes 22, the first core division wall 26, and the second core division wall (not illustrated) are slightly larger than the dimensions of those after the completion. This is for the purpose of installing positioning pins (not illustrated) necessary for brazing at the excess portions. The excess portions are cut along the shape of the spacers 24 after brazing.

2.2.2. Stacking of the First to n-th Layers

FIG. 11 shows a schematic diagram illustrating the second to fourth steps (stacking steps).

First, the first brazing material sheet (A) (not illustrated), the first heat medium heat-transfer tube 22(1) including the heat medium flow paths 22a, 22a, . . . , the first brazing material sheet (B) (not illustrated), and the frame-shaped first spacer 24(1) including the opening end 24a are placed in this order on the first core division wall 26. Then, the first filled body 30(1) is inserted into the first spacer 24(1) (the second step).

There is no particular limitation on the material for the brazing material sheets inserted between the members but the optimum material can be selected according to the purpose.

Further, when n≥2, (a) a step of placing the (k+1)-th brazing material sheet (A) (not illustrated), the (k+1)-th heat medium heat-transfer tube 22(k+1) with the heat medium flow paths 22a, 22a, . . . , the (k+1)-th brazing material sheet (B) (not illustrated), and the frame-shaped (k+1)-th spacer 24(k+1) with the opening end in this order on the k-th spacer 24(k) and the k-th filled body 30(k) (1≤k≤n−1), and (b) a step of inserting the (k+1)-th filled body 30(k+1) into the (k+1)-th spacer 24(k+1) are alternately repeated (the third step).

In this case, preferably, the pluralities of heat medium heat-transfer tubes 22 and spacers 24 are alternately stacked such that the heat medium flow paths 22a, 22a, . . . are oriented in almost the same direction and the opening ends 24a are oriented in almost the same direction.

When the first to n-th filled bodies 30(1) to 30(n) are vacuum-sealed vacuum packs, in the second and third steps, the k-th filled body 30(k) is preferably inserted into the k-th spacer 24(k) such that the front end of the k-th filled body 30(k) extends off the opening end 24a of the k-th spacer 24(k) (1≤k≤n). This is for the purpose of cutting the end portions of the stacked body and opening the vacuum packs at the same time after brazing.

2.2.3. Stacking of the Top Layer

After the completion of stacking of the necessary numbers of heat medium heat-transfer tubes 22, spacers 24, and filled bodies 30, the last heat medium heat-transfer tube 22 and the second core division wall 28 are placed on the stacked body.

Specifically, the (n+1)-th brazing material sheet (A) (not illustrated), the (n+1)-th heat medium heat-transfer tube 22(n+1) with the heat medium flow paths 22a, 22a, . . . , the (n+1)-th brazing material sheet (B) (not illustrated), and the second core division wall 28 are placed in this order on the n-th spacer 24(n) and the n-th filled body 30(n) such that the heat medium flow paths 22a, 22a, . . . are oriented in almost the same direction to obtain a stacked body 20' (the fourth step).

2.3. THE FIFTH STEP (BRAZING)

Next, while the entire stacked body 20' is restrained, the first to (n+1)-th brazing material sheets (A) and the first to (n+1)-th brazing material sheets (B) included in the stacked body 20' are melted to braze between the members included in the stacked body 20' (the fifth step). Accordingly, obtained is the core part 20 brazed:

(a) between the first core division wall 26 and the first heat medium heat-transfer tube 22(1);

(b) between the k-th heat medium heat-transfer tube 22(k) and the k-th spacer 24(k) (1≤k≤n);

(c) between the n-th spacer 24(n) and the (n+1)-th heat medium heat-transfer tube 22(n+1);

(d) between the (n+1)-th heat medium heat-transfer tube 22(n+1) and the second core division wall 28; and (e) between the k-th heat medium heat-transfer tube 22(k) and the k-th filled body 30(k) and the (k+1)-th heat medium heat-transfer tube 22(k+1) (1≤k≤n).

The brazing is performed by heating the stacked body 20' to a predetermined temperature. The brazing may be performed in a vacuum atmosphere or an inert atmosphere. In particular, vacuum brazing is preferred because this brazing method is unlikely to cause deterioration of a solid-gas reaction substance at the time of brazing.

2.4. THE SIXTH STEP (JOINING OF THE GAS INTRODUCTION/DISCHARGE PART AND THE HEAT MEDIUM INTRODUCTION/DISCHARGE PART)

Lastly, the gas introduction/discharge part 40 is joined to the core part in such a manner as to communicate with the opening ends 24a of the first to n-th spacers 24(1) to 24(n). In addition, the heat medium introduction/discharge part 50 is joined to the core part 20 in such a manner as to communicate with the heat medium flow paths 22a, 22a, ... of the first to (n+1)-th heat medium heat-transfer tubes 22(1) to 22(n+1) (the sixth step). Accordingly, the solid-gas reaction substance-filled reactor according to the present invention can be obtained.

There is no particular limitation on the method for joining the gas introduction/discharge part 40 and the heat medium introduction/discharge part 50. Examples of the method for joining include vacuum brazing, welding, and others.

2.5. THE SEVENTH STEP (OPENING OF THE VACUUM PACKS)

FIG. 12 shows a schematic diagram illustrating a step of opening the vacuum packs (the seventh step). When the filled bodies 30 are vacuum packs, after the fifth step and before the sixth step, the core part 20 is cut along the opening ends 24a of the spacers 24 (the seventh step). Accordingly, the excess portions of the core part 20 (for example, the portions necessary for determining vacuum brazing positions) are cut and the first to the n-th filled bodies 30(1) to 30(n) are opened at the same time.

There is no particular limitation on the method for cutting the core part 20. Examples of the method for cutting include laser cutting, wire cutting, and others. After the cutting, the gas introduction/discharge part 40 and the heat medium introduction/discharge part 50 are joined to the core part 20 (the sixth step).

3. EFFECT

First, a solid-gas reaction substance is filled into metallic bags to produce filled bodies. Next, heat medium heat-transfer tubes and spacers are stacked with brazing material sheets therebetween, and the filled bodies are inserted into the gaps in the spacers to obtain a stacked body. Melting the brazing material sheets in this state makes it possible to braze between the heat medium heat-transfer tubes and the spacers and between the heat medium heat-transfer tubes and the filled bodies by one heat treatment.

The thus obtained reactor has the solid-gas reaction substance already filled in the gas flow paths, which eliminates the need for a separate process to fill the solid-gas reaction substance. In addition, the core part can be obtained by one brazing treatment, which results in shortened manufacturing period. This achieves reduction in the manufacturing cost of the reactor.

When the solid-gas reaction substance is a metal hydride, for example, the reactor is produced with the metal hydride already filled, and thus the reactor can be used immediately after completion. Specifically, the metal hydride filled in the completed reactor is in a state capable of absorbing and desorbing hydrogen by subjecting to activation treatments (vacuum deaeration and hydrogen pressurization). In addition, it is possible to utilize an exothermic reaction accompanying hydrogen absorption and an endothermic reaction accompanying hydrogen desorption.

When a metal hydride is vacuum-packed in the metallic foil bags, the metal hydride is not exposed to the brazing materials or harmful gases at the time of vacuum brazing, thereby suppressing deterioration of the material characteristics. In addition, sealing a heat conduction aid and a heat transfer fin together with the metal hydride at the time of vacuum packing makes it possible to improve heat-transfer performance.

Embodiments of the present invention have been described in detail so far. However, the present invention is not limited to the foregoing embodiments but can be modified in various manners without deviation from the gist of the present invention.

The solid-gas reaction substance-filled reactor according to the present invention can be used for hydrogen storage/supply systems, $CO_2$ removal devices, chemical heat storage devices, heating/cooling systems using reaction heat, heat pump systems, and others.

What is claimed is:

1. A solid-gas reaction substance-filled reactor comprising:
    (1) a core part in which first to (n+1)-th heat medium heat-transfer tubes (n≥1) with heat medium flow paths for flowing a heat medium and frame-shaped first to n-th spacers with opening ends for introducing and discharging a gas are alternately stacked along a z-axis direction such that the heat medium flow paths and the opening ends are each oriented in almost the same direction, and first and second core division walls are each arranged at both ends as seen in the z-axis direction;
    a gas introduction/discharge part that is joined to the core part in such a manner as to communicate with the opening ends of the first to n-th spacers; and
    a heat medium introduction/discharge part that is joined to the core part in such a manner as to communicate with the heat medium flow paths,
    (2) the core part further includes a k-th filled body (1≤k≤n) that is inserted into a space surrounded by a k-th spacer (1≤k≤n), a k-th heat medium heat-transfer tube, and a (k+1)-th heat medium heat-transfer tube, the k-th filled body includes:
    a bag that is formed from metallic foil and is opened on the opening end side of the k-th spacer; and
    a solid-gas reaction substance filled in the bag, and
    (3) Brazing is applied at least between the k-th filled body (1≤k≤n) and the k-th heat medium heat-transfer tube and between the k-th filled body and the (k+1)-th heat medium heat-transfer tube.

2. The solid-gas reaction substance-filled reactor according to claim 1, wherein the solid-gas reaction substance includes a metal hydride.

3. The solid-gas reaction substance-filled reactor according to claim 1, wherein the gas introduction/discharge part has a filter to prevent scattering of the solid-gas reaction substance.

4. The solid-gas reaction substance-filled reactor according to claim 1, wherein each of the first to (n+1)-th heat medium heat-transfer tubes includes a plurality of the heat medium flow paths that penetrates from one end to the other end of the heat medium heat-transfer tube.

5. The solid-gas reaction substance-filled reactor according to claim 4, wherein the heat medium introduction/discharge part includes:
a manifold that has an inlet and an outlet for the heat medium and is connected to the core part in such a manner as to communicate with first ends of the heat medium flow paths; and
a header that is connected to the core part in such a manner as to communicate with second ends of the heat medium flow paths,
the manifold distributes the heat medium supplied from the inlet to the first to (n+1)-th heat medium heat-transfer tubes, and supplies the distributed heat medium to some of the heat medium flow paths included in the k-th heat medium heat-transfer tube (1≤k≤n+1), and
the header causes the heat medium discharged from some of the heat medium flow paths to turn around toward the remaining heat medium flow paths and discharges the same from the outlet.

6. The solid-gas reaction substance-filled reactor according to claim 4, wherein the heat medium introduction/discharge part includes:
a first manifold having an inlet for the heat medium and connected to the core part in such a manner as to communicate with first ends of the heat medium flow paths; and
a second manifold having an outlet for the heat medium and connected to the core part in such a manner as to communicate with second ends of the heat medium flow paths and,
the first manifold distributes the heat medium supplied from the inlet to the first to (n+1)-th heat medium heat-transfer tubes, and supplies the distributed heat medium to all the heat medium flow paths included in the first to (n+1)-th heat medium heat-transfer tubes in the same direction, and
the second manifold discharges from the outlet the heat medium discharged from the heat medium flow paths.

7. The solid-gas reaction substance-filled reactor according to claim 4, wherein the heat medium introduction/discharge part includes:
a first manifold having an inlet for the heat medium and connected to the core part in such a manner as to communicate with first ends of the heat medium flow paths; and
a second manifold having an outlet for the heat medium and connected to the core part in such a manner as to communicate with second ends of the heat medium flow paths and,
each of the first manifold and the second manifold connects in series the heat medium flow paths included in the k-th heat medium heat-transfer tube and the heat medium flow paths included in the (k+1)-th heat medium heat-transfer tube such that:
(a) the heat medium flows in the +x-axis direction in the heat medium flow paths included in the k-th heat medium heat-transfer tube, and
(b) the heat medium flows in the −x-axis direction in the heat medium flow paths included in the (k+1)-th heat medium heat-transfer tube.

8. The solid-gas reaction substance-filled reactor according to claim 4, wherein
the first to (n+1)-th heat medium heat-transfer tubes have the heat medium flow paths arranged such that the flowing direction of the heat medium is almost the same as the flowing direction of a gas,
the heat medium introduction/discharge part includes:
a first manifold having an inlet for the heat medium and connected to the core part in such a manner as to communicate with first ends of the heat medium flow paths; and
a second manifold having an outlet for the heat medium and connected to the core part in such a manner as to communicate with second ends of the heat medium flow paths,
the first manifold distributes the heat medium supplied from the inlet to the first to (n+1)-th heat medium heat-transfer tubes and supplies the distributed heat medium to all the heat medium flow paths included in the first to (n+1)-th heat medium heat-transfer tubes in the same direction, and
the second manifold discharges the heat medium from the heat medium flow paths from the outlet.

9. A method for manufacturing a solid-gas reaction substance-filled reactor comprising the following steps:
(1) a first step of preparing first to n-th filled bodies (n≥1) in which a solid-gas reaction substance is filled into bag formed from metallic foil;
(2) a second step of placing a first brazing material sheet (A), a first heat medium heat-transfer tube with heat medium flow paths, a first brazing material sheet (B), and a frame-shaped first spacer with an opening end in this order on a first core division wall, and inserting the first filled body into the first spacer;
(3) when n≥2, a third step of alternately repeating:
a step of placing a (k+1)-th brazing material sheet (A), a (k+1)-th heat medium heat-transfer tube with heat medium flow paths, a (k+1)-th brazing material sheet (B), and a frame-shaped (k+1)-th spacer with an opening end in this order on a k-th spacer and a k-th filled body (1≤k≤n−1) such that the heat medium flow paths are oriented in almost the same direction and the opening ends are oriented in almost the same direction; and
a step of inserting the (k+1)-th filled body into the (k+1)-th spacer;
(4) a fourth step of placing an (n+1)-th brazing material sheet (A), an (n+1)-th heat medium heat-transfer tube with heat medium flow paths, an (n+1)-th brazing material sheet (B), and a second core division wall in this order on an n-th spacer and the n-th filled body such that the heat medium flow paths are oriented in almost the same direction to obtain a stacked body;
(5) a fifth step of melting the first to (n+1)-th brazing material sheets (A) and the first to (n+1)-th brazing material sheets (B) to braze between the members included in the stacked body to obtain a core part; and
(6) a sixth step of joining a gas introduction/discharge part to the core part in such a manner as to communicate with the opening ends of the first to n-th spacers, and joining a heat medium introduction/discharge part to the core part in such a manner as to communicate with the heat medium flow paths of the first to (n+1)-th heat medium heat-transfer tubes.

10. The method for manufacturing a solid-gas reaction substance-filled reactor according to claim 9, wherein the solid-gas reaction substance includes a metal hydride.

11. The method for manufacturing a solid-gas reaction substance-filled reactor according to claim 9, wherein
the first to n-th filled bodies are vacuum-sealed vacuum packs, in the second and third steps, the k-th filled body is inserted into the k-th spacer such that a front end of the k-th filled body extends off the opening end of the k-th spacer ($1 \leq k \leq n$), and a seventh step is further included between the fifth step and the sixth step to cut the core part along the opening ends and open the first to n-th filled bodies.

12. The method for manufacturing a solid-gas reaction substance-filled reactor according to claim 9, wherein, in the fifth step, the stacked body is vacuum-brazed.

* * * * *